(12) United States Patent
Kim et al.

(10) Patent No.: US 9,327,468 B2
(45) Date of Patent: May 3, 2016

(54) MANUFACTURING METHOD AND APPARATUS FOR HYBRID FRP BAR, AND NOZZLE FOR SUCH APPARATUS

(71) Applicant: Korea Institute of Construction Technology, Goyang-si, Gyeonggi-do (KR)

(72) Inventors: Hyeong Yeol Kim, Goyang-si (KR); Young Jun You, Goyang-si (KR); Jae Heum Moon, Seoul (KR); Sang Yoon Lee, Goyang-si (KR); Min Su Park, Goyang-si (KR); Ki Tae Park, Goyang-si (KR)

(73) Assignee: Korea Institute of Construction Technology, Goyang-si (KR)

( * ) Notice: Subject to any disclaimer, the term of this patent is extended or adjusted under 35 U.S.C. 154(b) by 231 days.

(21) Appl. No.: 14/066,452

(22) Filed: Oct. 29, 2013

(65) Prior Publication Data

US 2014/0117578 A1    May 1, 2014

(30) Foreign Application Priority Data

Nov. 1, 2012  (KR) .................. 10-2012-0122852

(51) Int. Cl.
    *B29D 99/00*    (2010.01)
(52) U.S. Cl.
    CPC ................. *B29D 99/0046* (2013.01)
(58) Field of Classification Search
    CPC ... B29D 99/0046; F16C 7/026; B29C 70/305; B29C 47/023

USPC .............. 264/171.1, 172.11, 172.13, 172.15; 425/114
See application file for complete search history.

(56) References Cited

U.S. PATENT DOCUMENTS

| 4,770,834 A | 9/1988 | Nakasone et al. |
| 6,322,001 B1 | 11/2001 | Sand |
| 2004/0001941 A1* | 1/2004 | Kusek ..................... 428/292.1 |
| 2009/0023870 A1* | 1/2009 | Berksoy et al. .............. 525/453 |
| 2009/0065969 A1* | 3/2009 | Perera et al. ............. 264/172.15 |

FOREIGN PATENT DOCUMENTS

| JP | 06-285885 | 10/1994 |
| JP | 08-011222 | 1/1996 |
| KR | 20-0311874 | 4/2003 |

* cited by examiner

*Primary Examiner* — Alison L Hindenlang
*Assistant Examiner* — Mohamed K Ahmed Ali
(74) *Attorney, Agent, or Firm* — Fenwick & West LLP (57) ABSTRACT

A rod-shaped FRP bar is manufactured with a fiber and a resin by using a nozzle (100) which includes an outer nozzle (11) having a penetration hole at its center and a plurality of middle nozzles (12) disposed at an inlet of the outer nozzle 11 so that one middle nozzle is located inside another middle nozzle with an interval. Fibers are supplied through a center hole of the middle nozzle located at an innermost location, through intervals between the middle nozzles and through intervals between the middle nozzles and the outer nozzle, thereby making a hybrid FRP bar (1) having a section in which the fibers configure a plurality of fiber distribution layers from the center of the FRP bar toward the outside.

2 Claims, 10 Drawing Sheets

MANUFACTURING METHOD AND APPARATUS FOR HYBRID FRP BAR, AND NOZZLE FOR SUCH APPARATUS

CROSS-REFERENCE TO RELATED APPLICATION

This application claims priority to Korean Patent Application No. 10-2012-0122852, filed on Nov. 1, 2012, and all the benefits accruing therefrom under 35 U.S.C. §119, the contents of which in its entirety are herein incorporated by reference.

BACKGROUND

1. Field

The present invention relates to a manufacturing method and an apparatus for a fiber reinforced polymer (FRP) bar, and more particularly, to a manufacturing method and an apparatus for a FRP bar which does not cause excessive bending deflection even though a fiber having a low elastic modulus is used, by introducing a compression force in advance. In addition, the present invention relates to a method and an apparatus for manufacturing a hybrid FRP bar by using at least two kinds of fibers so that the fibers may be easily distributed to specific locations at the section of the manufactured hybrid FRP bar, and a nozzle for such an apparatus.

2. Description of the Related Art

A steel bar used for a reinforced concrete structure is always exposed to possibility of corrosion. A steel bar in concrete is highly likely to contact moisture due to cracks or the like, and in particular, the steel bar is corroded due to residual moisture in the concrete, in addition to cracks. If the steel bar is corroded, the volume of the steel bar expands, which results in separation of concrete cover. Therefore, the reinforced concrete structure loses integrity, which is an essential requirement of the reinforced concrete structure, and is not able to serve as a structural member.

In order to solve this problem, rod-shaped products manufactured using a fiber reinforced polymer (FRP) have been used instead of steel bars distributed in a concrete structure or to assist the steel bars. Such a rod-shaped product manufactured using FRP is generally called "FRP bar" or "FRP rebar" since it is used for reinforcing a concrete structure.

Figure 1:
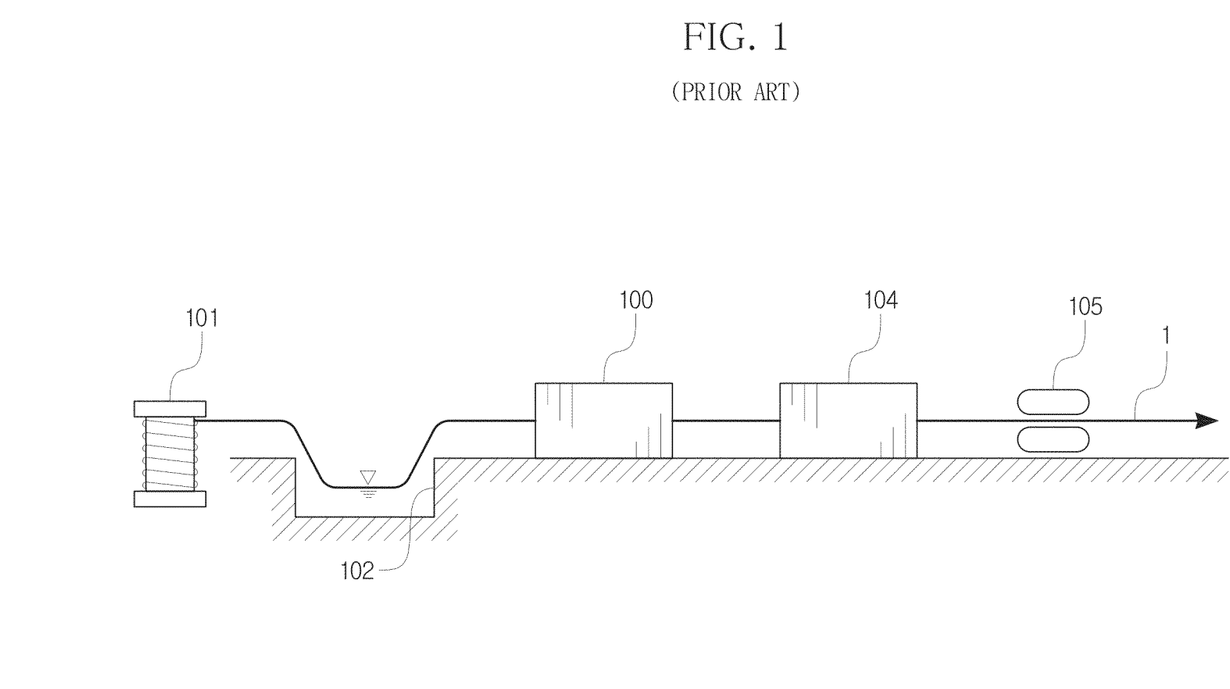
FIG. 1 is a schematic diagram showing an existing device for manufacturing a FRP bar.

Korean Patent Registration No. 10-0702629 discloses a technique for manufacturing such a FRP bar, and FIG. 1 shows a schematic configuration of an existing device for manufacturing a FRP bar. As shown in FIG. 1, in an existing technique, a FRP bar 1 is manufactured by a manufacturing apparatus including a fiber winding reel 101, a resin supplier 102, a nozzle 100, a heater 104 and a drawer 105. In order to manufacture the FRP bar, first, fibers as thin as threads, supplied from the fiber winding reel 101, are bound into a bundle and drawn to the drawer 105. In this time, while passing through the resin supplier 102, the fibers are formed into a rod shape while entering the nozzle 100 together with a resin, and the resin is hardened through the heater 104, thereby making the FRP bar 1.

The fibers used for manufacturing a rod-shaped FRP bar 1 having a circular, oval or polygonal section by bundling the fibers impregnated in a resin as described above use carbon fibers, aramid fibers, steel wires, glass fibers or the like, among which glass fibers are advantageous for cost reduction. However, when the FRP bar 1 is manufactured using glass fibers, the glass fibers have a lower elastic modulus than the steel bar even though its tensile strength is much greater than that of the steel bar. Therefore, if the FRP bar 1 is used for reinforcing a bending member, a great drooping is caused at the bending member. In other words, if the FRP bar 1 is manufactured using a fiber having a low elastic modulus such as a glass fiber, an excessive bending deflection is caused at a concrete structure to which a bending load is applied.

As a solution, there has been proposed a technique for manufacturing a FRP bar by mixing several kinds of fibers having different elastic modulus. The FRP bar 1 manufactured using several kinds of fibers together may be called a "hybrid FRP bar". The hybrid FRP bar may ensure good economical feasibility since several kinds of fibers are mixed, thereby ensuring more improved elastic modulus in comparison to a FRP using only glass fibers. The hybrid FRP bar may use, for example, a glass fiber having a low elastic modulus and a carbon fiber having a high elastic modulus.

However, when manufacturing a hybrid FRP bar by using several kinds of fibers, it may be needed to distribute the several kinds of fibers at different locations in the section of the FRP bar. If the hybrid FRP bar uses a glass fiber and a carbon fiber as in the above example, it may be needed to locate the glass fiber at the center of the section and the carbon fiber at the periphery of the section.

Fibers used in the FRP bar have a very small diameter like threads and several ten or hundred strands are bundled. However, there has not been developed a technique for efficiently manufacturing a hybrid FRP bar using several kinds of fibers which are distributed at specific locations in the section of the FRP bar as designed.

SUMMARY

The present invention is directed to providing a FRP bar which does not cause excessive bending deflection even though it is used for a concrete structure to which a bending load is applied.

Further, the present invention is directed to providing a manufacturing method for a hybrid FRP bar using at least two kinds of fibers which are distributed at specific locations of the section of the hybrid FRP bar as designed, and a manufacturing apparatus therefor.

In one aspect, there is provided a manufacturing apparatus for a fiber reinforced polymer (FRP) bar, which includes a fiber winding reel, a resin supplier, a nozzle and a drawer and manufactures a rod-shaped FRP bar with a fiber and a resin, wherein the nozzle includes an outer nozzle and a plurality of middle nozzles disposed at an inlet of the outer nozzle so that one middle nozzle is located inside another middle nozzle with an interval, and wherein fibers are supplied through a center hole of the middle nozzle located at an innermost location, through intervals between the middle nozzles and through intervals between the middle nozzles and the outer nozzle, thereby making a hybrid FRP bar having a section in which the fibers configure a plurality of fiber distribution layers from the center of the FRP bar toward the outside.

In the manufacturing apparatus for a FRP bar according to the present invention, coupling units may be disposed at the intervals between the middle nozzle and the outer nozzle and between the middle nozzles, and the fibers may be supplied distinguishably in a circumferential direction in each fiber distribution layer by the coupling units. In addition, a plate-shaped guide member having penetration holes extending in a circumferential direction and intermittently formed along the circumference at locations corresponding to any one or all of the intervals between the outer nozzle and the middle nozzle and between the middle nozzles may be disposed in front of an inlet of the nozzle, and the fibers may be supplied to the inlet of the nozzle through the penetration holes of the guide member.

In the manufacturing apparatus of the present invention, the guide member may be integrally coupled to the inlet of the nozzle.

In another aspect of the present invention, there is provided a method for manufacturing a FRP bar by using the manufacturing apparatus for a FRP bar according to the present invention.

In particular, the present invention provides a manufacturing method for a FRP bar by using the manufacturing apparatus, wherein the fiber supplied through the center hole of the middle nozzle located at the innermost location, the fiber supplied through the interval between the middle nozzles and the fiber supplied through the interval between the middle nozzles and the outer nozzle are of different kinds from each other, thereby making a hybrid FRP bar having a section in which the different kinds of fibers are respectively distributed at a plurality of fiber distribution layers.

In addition, the present invention provides a manufacturing method for a FRP bar by using the manufacturing apparatus, wherein coupling units are disposed at the intervals between the middle nozzle and the outer nozzle and between the middle nozzles, and wherein different kinds of fibers are supplied through the intervals between the middle nozzle and the outer nozzle and between the middle nozzles to regions distinguished in a circumferential direction by the coupling units, thereby making a hybrid FRP bar having a section in which the different kinds of fibers are distributed in each fiber distribution layer in the circumferential direction.

Further, the present invention provides a manufacturing method for a FRP bar by using the manufacturing apparatus having the guide member, wherein different kinds of fibers may pass through the penetration holes of the guide member.

According to the present invention, a hybrid FRP bar may be manufactured using at least two kinds of fibers which are distributed at specific locations of the section of the FRP bar as designed. Therefore, a fiber having a great elongation rate is distributed at an inner region of the hybrid FRP bar, and a fiber having a small elongation rate is distributed at an outer region of the hybrid FRP bar. In this way, it is possible to very easily manufacture a hybrid FRP bar with excellent performance, which does not cause great bending deflection when being used for a bending member.

In addition, according to the present invention, a compression force may be introduced to the FRP bar in advance. Therefore, if the hybrid FRP bar of the present invention is used for a concrete structure serving as a bending member, a tensile force applied to the hybrid FRP bar by a bending stress is offset by the compression force introduced in advance, and accordingly it is possible to prevent excessive bending deflection from occurring at the concrete structure.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF MAIN ELEMENTS

11: outer nozzle
12: middle nozzle
100: nozzle
200: guide member

DETAILED DESCRIPTION

Hereinafter, an embodiment of the present invention will be described with reference to the accompanying drawings. Even though the present invention is based on the embodiments depicted in the drawings, it is just for better understanding, and the spirit, essential configurations and operations of the present invention are not limited thereto.

In the present invention, fibers impregnated in a resin are bundled and drawn to make a fiber reinforced polymer (FRP) bar. For this, similar to existing techniques described above, a manufacturing apparatus for a FRP bar according to the present invention may include a fiber winding reel 101, a resin supplier 102, a nozzle 100 and a drawer 105. Therefore, in the manufacturing method for a FRP bar according to the present invention, a fiber bundle impregnated in a resin is drawn to pass through the nozzle 100, thereby forming into a rod shape, and the resin is hardened to make the FRP bar 1. In the present invention, if required, the resin may be hardened using a heater 104. Meanwhile, in the present invention, a fiber used for manufacturing the FRP bar may be a carbon fiber, an aramid fiber, a glass fiber or the like, and a steel wire such as a piano wire may also be used. Therefore, in the disclosure of this specification, the term "fiber" mentioned as material of the FRP bar should be understood as including a steel wire such as a piano wire in addition to the carbon fiber, the aramid fiber, the glass fiber and other fibers made of synthetic resins or other various materials.

In the manufacturing apparatus and the manufacturing method for a FRP bar according to the present invention, the nozzle 100 for bundling fibers impregnated in a resin into a rod shape with a designed sectional size has the following configuration. In detail, FIG. 2 is a schematic perspective view showing the nozzle 100 according to an embodiment of the present invention, FIG. 3 is a schematic perspective sectional view showing the nozzle 100 of FIG. 2, taken along the line A-A, and FIG. 4 is a schematic side sectional view showing that several kinds of fibers are supplied to the nozzle 100 of FIG. 2, taken along the line A-A.

As shown in the figures, in the present invention, the nozzle 100 is configured to include a pipe-shaped outer nozzle 11 having a penetration hole formed at its center and having an inlet with a greater sectional area than an outlet, and a plurality of middle nozzles 12 disposed at the inlet of the outer nozzle 11 and disposed so that one middle nozzle is located inside another middle nozzle. There may be provided a plurality of middle nozzles 12. In the embodiment depicted in the drawings, two middle nozzles 12 are provided. In this specification, when the plurality of middle nozzles 12 is mentioned, a reference symbol '12' is used thereto. However, when two middle nozzles are separately mentioned, they are respectively called a 'first middle nozzle 12a' and a 'second middle nozzle 12b', from the outer nozzle 11.

Figure 2:
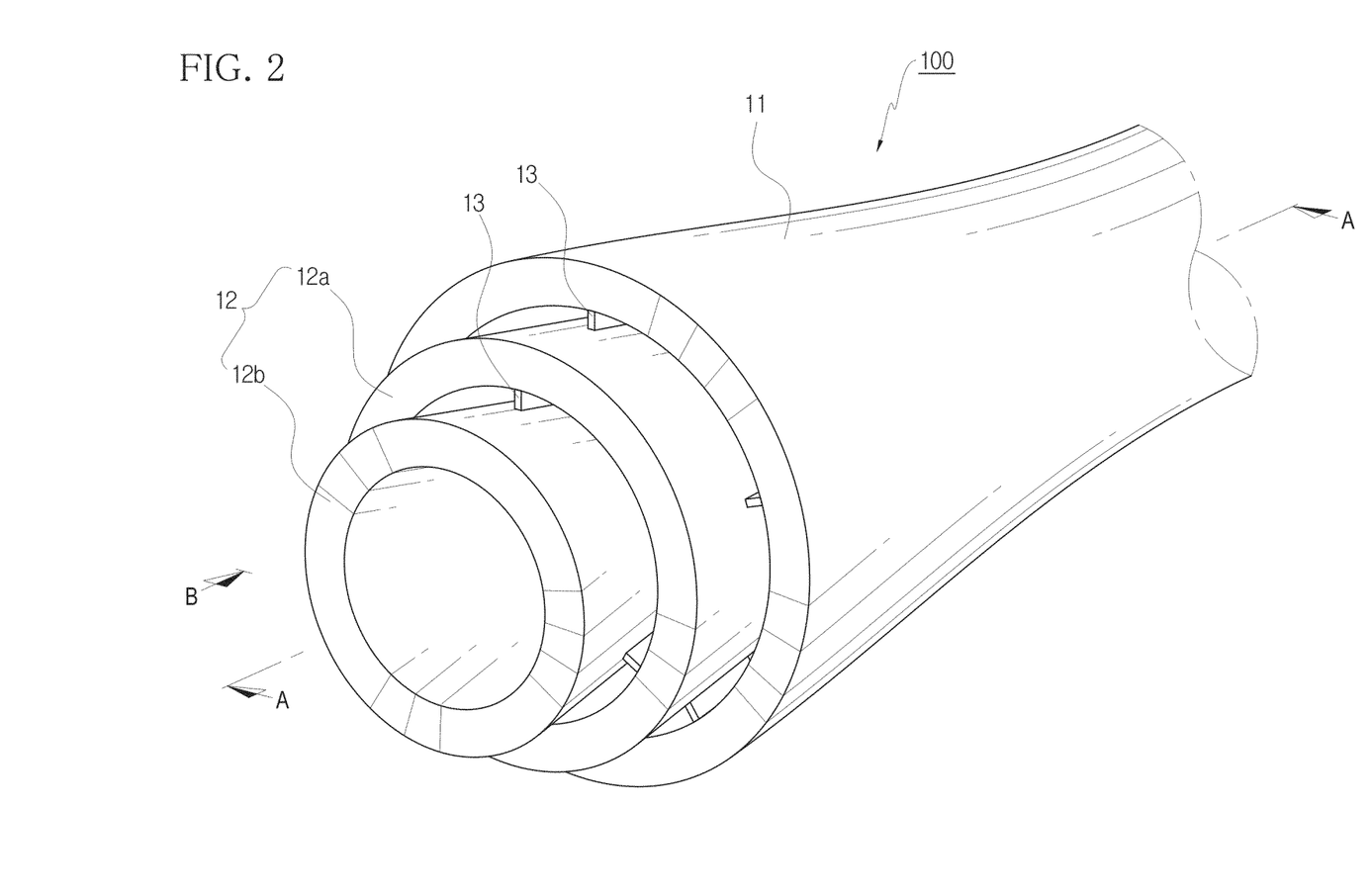
FIG. 2 is a schematic perspective view showing a nozzle according to an embodiment of the present invention.
Figure 3:
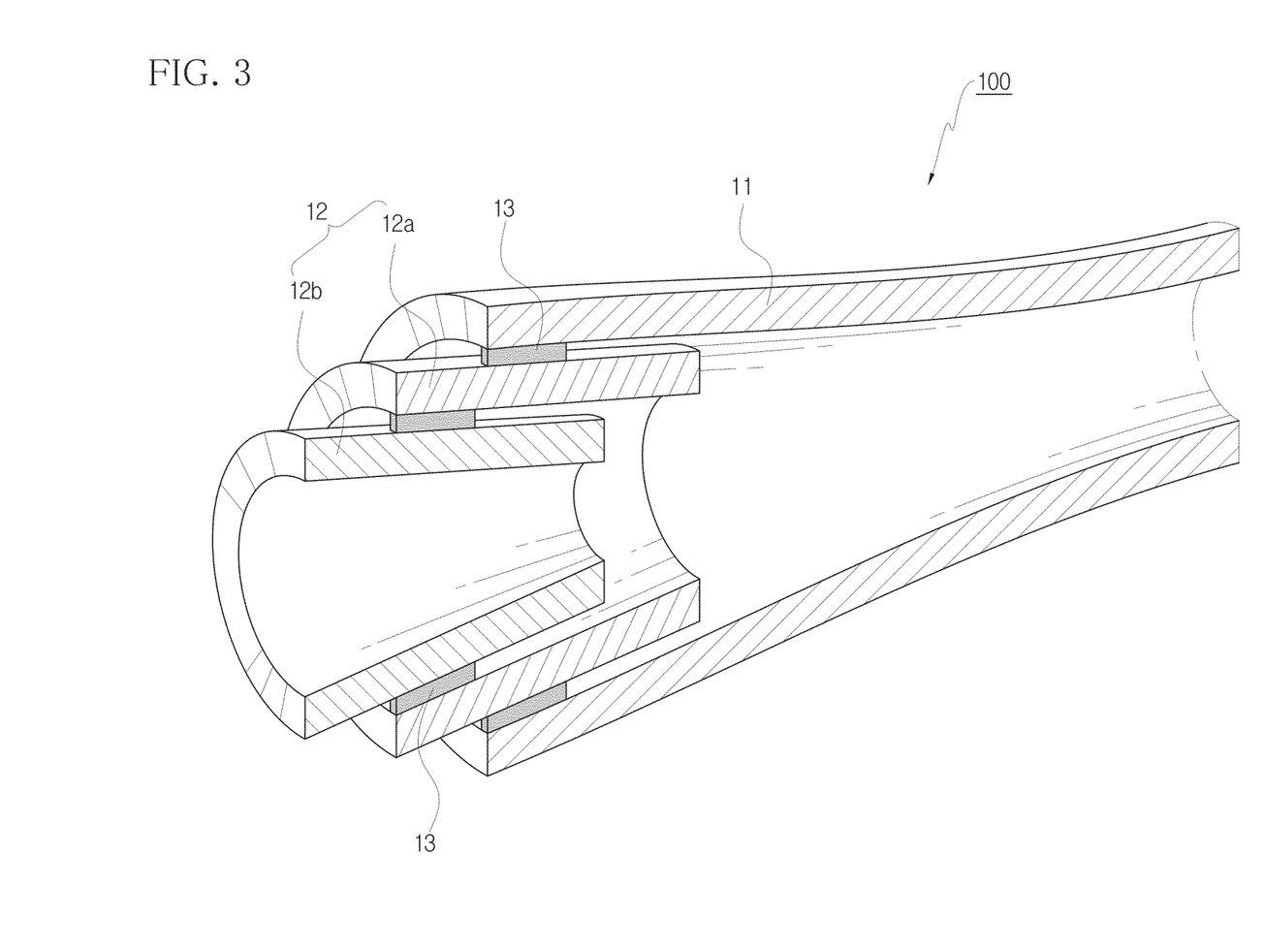
FIG. 3 is a schematic perspective sectional view showing the nozzle of FIG. 2, taken along the line A-A.
Figure 4:
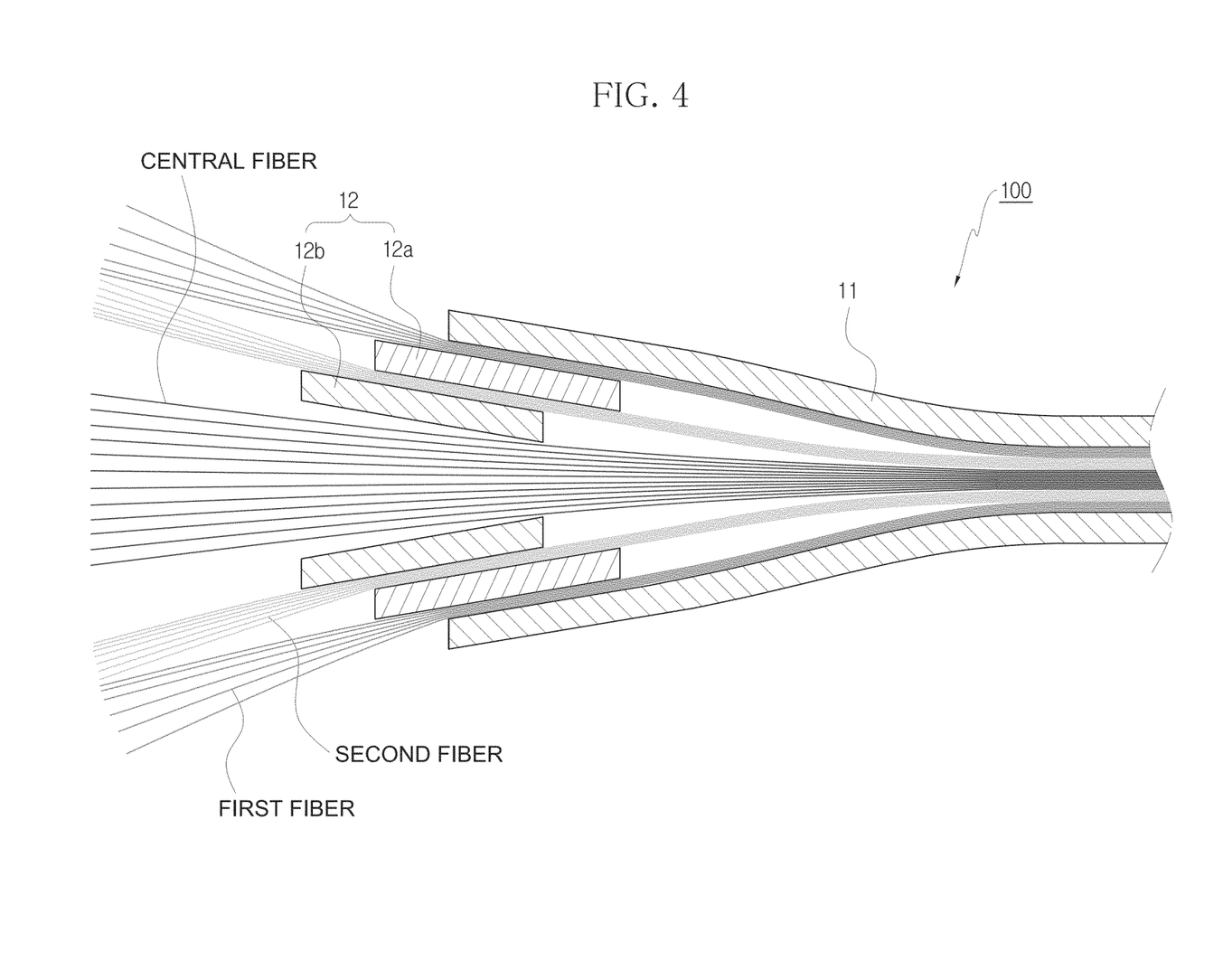
FIG. 4 is a schematic side sectional view showing that several kinds of fibers are supplied to the nozzle of FIG. 2, taken along the line A-A.

The outer nozzle 11 according to the embodiment depicted in FIGS. 2 to 4 is made of a pipe-shaped member having a penetration hole formed at its center. The inlet of the outer nozzle 11 through which a fiber enters may have a greater sectional area than the outlet of the outer nozzle 11 through which a fiber is drawn out. In this configuration, when a fiber entering the inlet is pulled by the drawer to discharge through the outlet, a very strong frictional force is applied between the inner surface of the outer nozzle 11 and the fiber. Accordingly, the fiber discharging from the outlet of the outer nozzle 11 is provided with a tensile force. In other words, the fiber is in a pre-strained state. The fiber in such a pre-strained state is hardened together with the rein. In the state where the resin is hardened, the fiber is cut into a necessary length by a cutter (not shown), thereby making the FRP bar 1. Therefore, the fiber which has been already pulled while passing through the nozzle 100 has a tendency of shrinking again due to elasticity, namely an elastic restoring force, and accordingly a compression force is introduced to the FRP bar.

If the FRP bar of the present invention is used for a concrete structure serving as a bending member, the tensile force applied to the FRP bar by a bending stress is offset by the compression force introduced in advance, and therefore it is possible to prevent excessive bending deflection.

Meanwhile, in the present invention, when a fiber is supplied to the inlet of the outer nozzle 11, the middle nozzle 12 may allow the fiber to be supplied in a state of being distinguished into a plurality of layers. The first middle nozzle 12a has an outer size smaller than the inlet of the outer nozzle 11, and an interval may be present between the inner surface of the outer nozzle 11 and the outer surface of the first middle nozzle 12a. In other words, the first middle nozzle 12a is located inside the inlet of the outer nozzle 11. In particular, in the embodiment depicted in the figures, the first middle nozzle 12a has a corn shape which is tapered so that the inlet has a greater sectional size than the outlet, similar to the outer nozzle 11.

The first middle nozzle 12a is disposed inside the outer nozzle 11 with an interval as described above, and then a second middle nozzle 12b is disposed inside inlet of the first middle nozzle 12a with an interval. In other words, similar to the arrangement of the outer nozzle 11 and the first middle nozzle 12a, the second middle nozzle 12b has a smaller outer size than the inlet of the first middle nozzle 12a, and thus the second middle nozzle 12b is located inside the inlet of the first middle nozzle 12a so that an interval is present between the inner surface of the first middle nozzle 12a and the outer surface of the second middle nozzle 12b. In the embodiment depicted in the drawings, the second middle nozzle 12b also has a corn shape which is tapered so that the inlet has a greater sectional size than the outlet.

In the embodiment depicted in the figures, just two middle nozzles including the first middle nozzle 12a and the second middle nozzle 12b are provided. However, if required, more middle nozzles such as a third middle nozzle, a fourth middle nozzle or the like may be further arranged. In this case, the third middle nozzle, the fourth middle nozzle or the like may be provided by repeating the process of disposing the second middle nozzle 12b in the first middle nozzle 12a. In other words, when a plurality of middle nozzles is provided, an inner middle nozzle is disposed at the inlet of an outer middle nozzle so that an interval is present between both middle nozzles.

In order to maintain the interval between the outer nozzle 11 and the first middle nozzle 12a, a coupling unit 13 for connecting the outer nozzle 11 to the first middle nozzle 12a may be provided. Between the first middle nozzle 12a and the second middle nozzle 12b, a coupling unit 13 for arranging them with an interval is also provided. In the embodiment depicted in the figures, plate members are respectively disposed between the inner surface of the outer nozzle 11 and the outer surface of the first middle nozzle 12a and between the inner surface of the first middle nozzle 12a and the outer surface of the second middle nozzle 12b to configure the coupling unit 13, but the configuration of the coupling unit 13 is not limited thereto.

Figure 5:
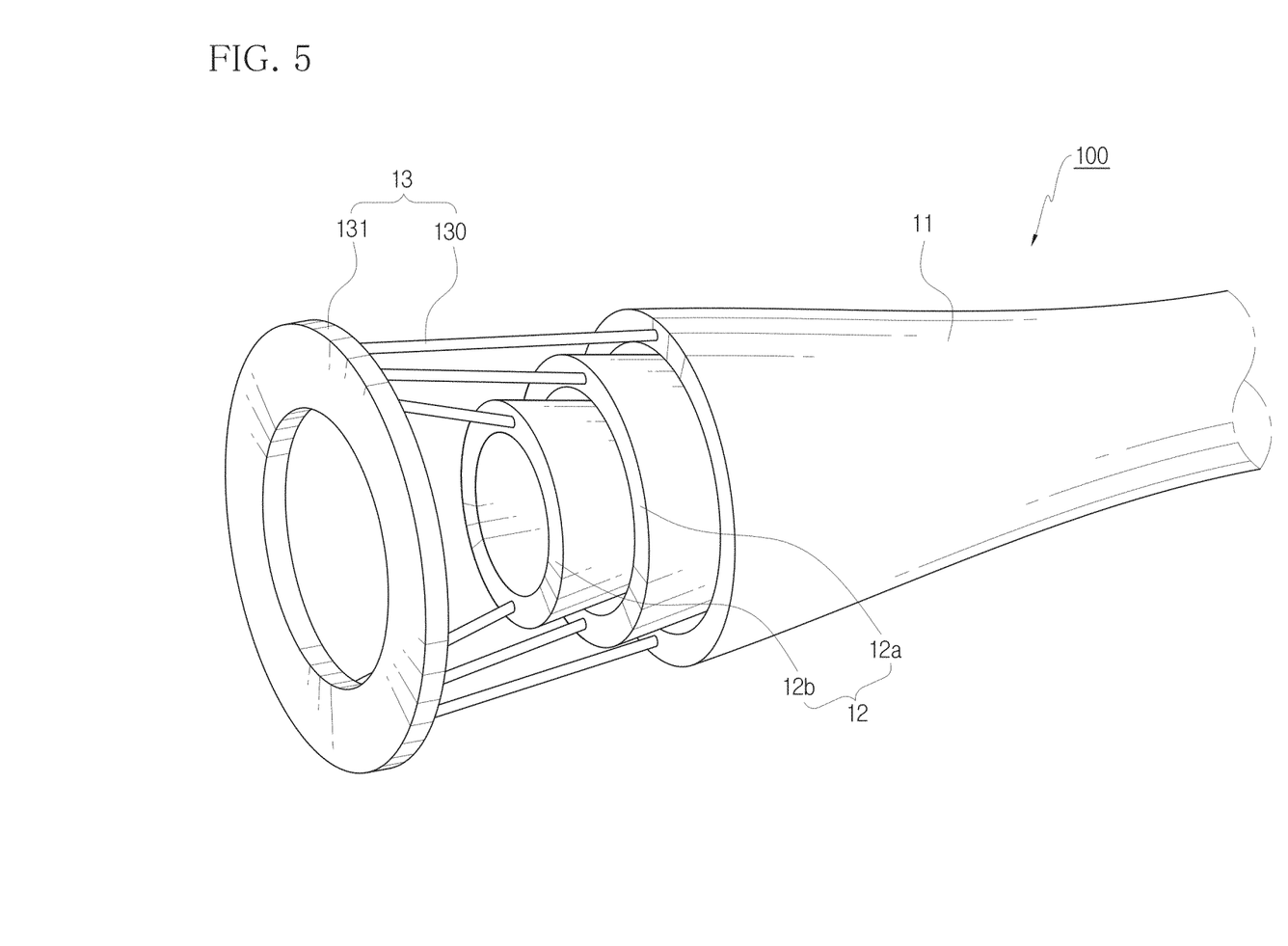
FIG. 5 is a schematic perspective sectional view showing a nozzle according to another embodiment of the present invention, which has a coupling unit of a different configuration.

FIG. 5 is a schematic perspective view showing a nozzle 100 according to another embodiment of the present invention, in which the coupling unit 13 has a different configuration. In the embodiment depicted in FIG. 5, the coupling unit 13 includes connection rods 130 individually connected to the outer nozzle 11 and the middle nozzle 12, respectively, and an integrating unit 131 for integrating the connection rods 130. As described above, the coupling unit 13 of the present invention may have various structures as long as the outer nozzle 11 and the middle nozzles 12 are disposed in order with intervals between them.

Figure 6:
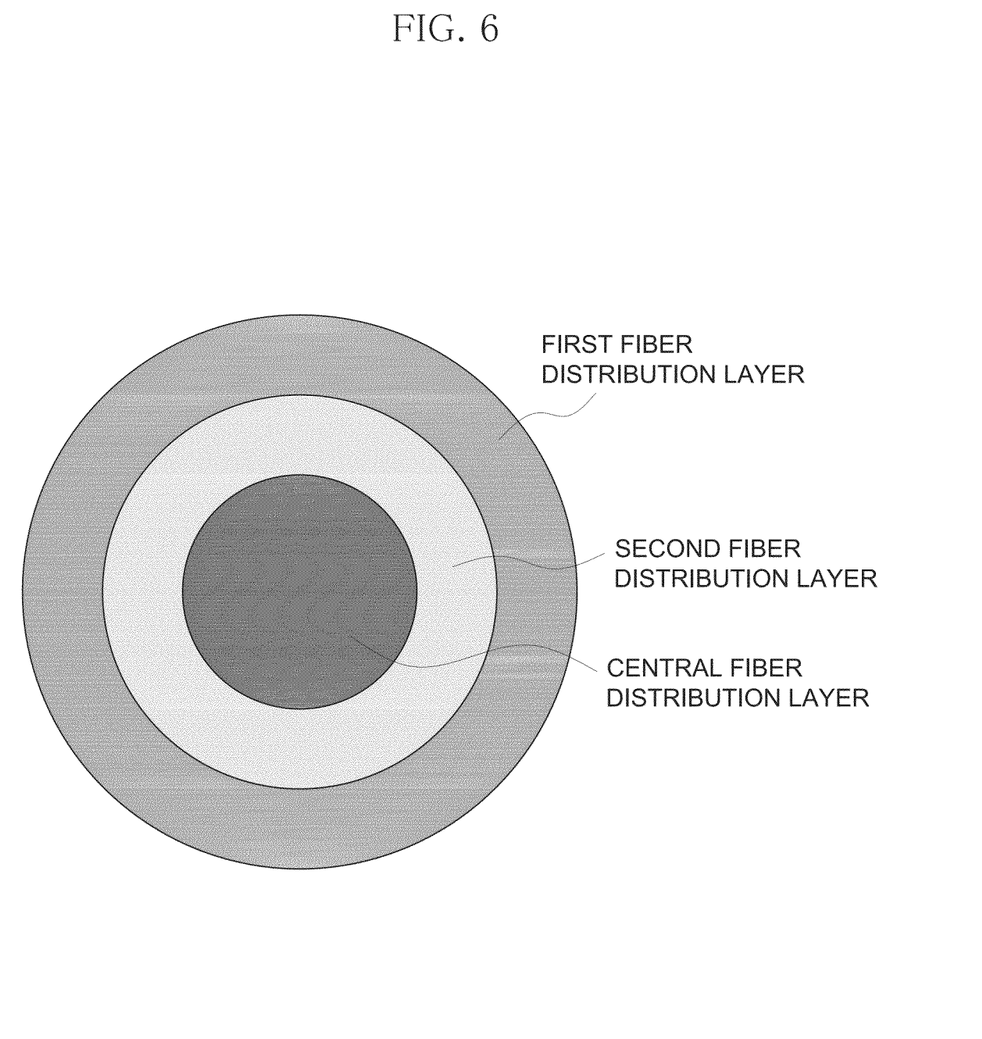
FIG. 6 is a schematic sectional view showing a hybrid FRP bar manufactured to have a circular section with a plurality of fiber distribution layers by using the nozzle of the present invention.

Meanwhile, as shown in FIG. 4, a fiber is supplied to the nozzle 100 in which the outer nozzle 11 and the middle nozzles 12 are disposed in order with intervals. In order to show a state of the supplied fiber, the coupling unit 13 is not depicted in FIG. 4. As shown in FIG. 4, a fiber is supplied straightly to the center hole of the middle nozzle present at the innermost side (the second middle nozzle in the embodiment depicted in the figures). In addition, a fiber is also supplied through an interval present between the middle nozzles 12 (the interval between the first middle nozzle and the second middle nozzle in the embodiment depicted in the figures). Moreover, a fiber is also supplied through an interval between the middle nozzle 12 and the outer nozzle 11 (the interval between the outer nozzle and the first middle nozzle in the embodiment depicted in the figures). When being observed on the section, the fibers supplied through several intervals as described above configure a plurality of layers, and discharge through the central penetration holes of the outer nozzle 11 and are drawn out. FIG. 6 is a schematic sectional view showing a hybrid FRP bar 1 configured to have a circular section while passing through the nozzle 100 of the present invention. As shown in FIG. 6, the fiber supplied through the interval between the outer nozzle 11 and the first middle nozzle 12a is distributed at a first fiber distribution layer which forms the outermost side of the hybrid FRP bar 1. In addition, the fiber supplied through the interval between the first middle nozzle 12a and the second middle nozzle 12b is distributed at a second fiber distribution layer located inside the first fiber distribution layer. Similarly, the fiber supplied through the center hole of the second middle nozzle 12b is distributed at a central fiber distribution layer which is located at the center.

As described above, if the nozzle 100 according to the present invention is used, the fibers may be distributed to be distinguished into a plurality of layers in the section of the hybrid FRP bar 1. Therefore, if the fiber supplied through the central hole of the middle nozzle at the innermost side, the fiber supplied through the interval between the middle nozzles, and the fiber supplied through the interval between the outer nozzle and the middle nozzle are of different kinds, it is possible to make a hybrid FRP bar in which several kinds of fibers are distributed in multiple layers in the radial direction. An example in which a hybrid FRP bar is made with three kinds of fibers, namely a glass fiber, an aramid fiber and a carbon fiber will be described. First, a glass fiber is supplied through the center of the second middle nozzle 12b, an aramid fiber is supplied through the interval between the first middle nozzle 12a and the second middle nozzle 12b, and a carbon fiber is supplied through the interval between the outer nozzle 11 and the first middle nozzle 12a. If so, a hybrid FRP bar having a central fiber distribution layer in which the glass fiber is distributed, a second fiber distribution layer in which the aramid fiber is distributed, and a first fiber distribution layer in which the carbon fiber is distributed, when being observed from the inner side to the outer side, may be very easily manufactured. In this way, according to the present invention, a hybrid FRP bar may be easily manufactured using at least two kinds of fibers which are distributed at specific locations of the section as designed.

Meanwhile, when manufacturing a hybrid FRP bar having a plurality of fiber distribution layers as described above, it is also possible that several kinds of fibers are distributed in a single fiber distribution layer.

Figure 7:
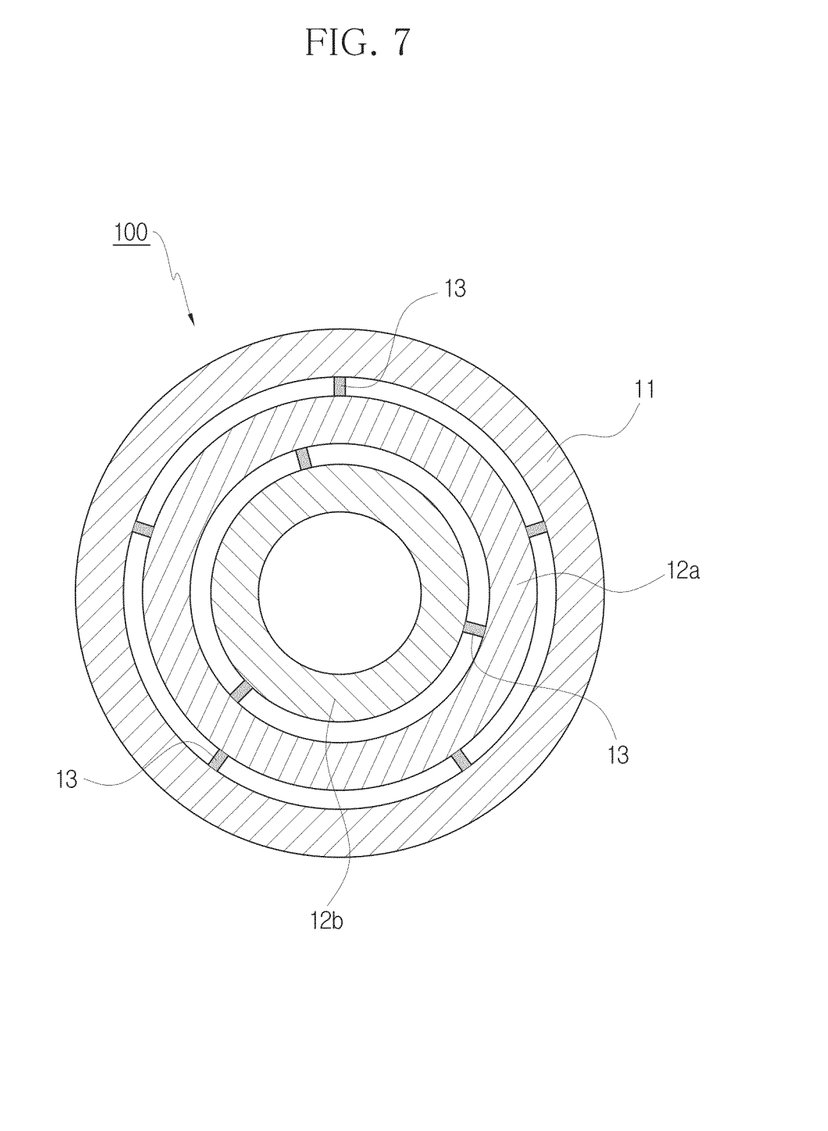
FIG. 7 is a schematic side view showing the nozzle of FIG. 2, observed along the arrow B.
Figure 8:
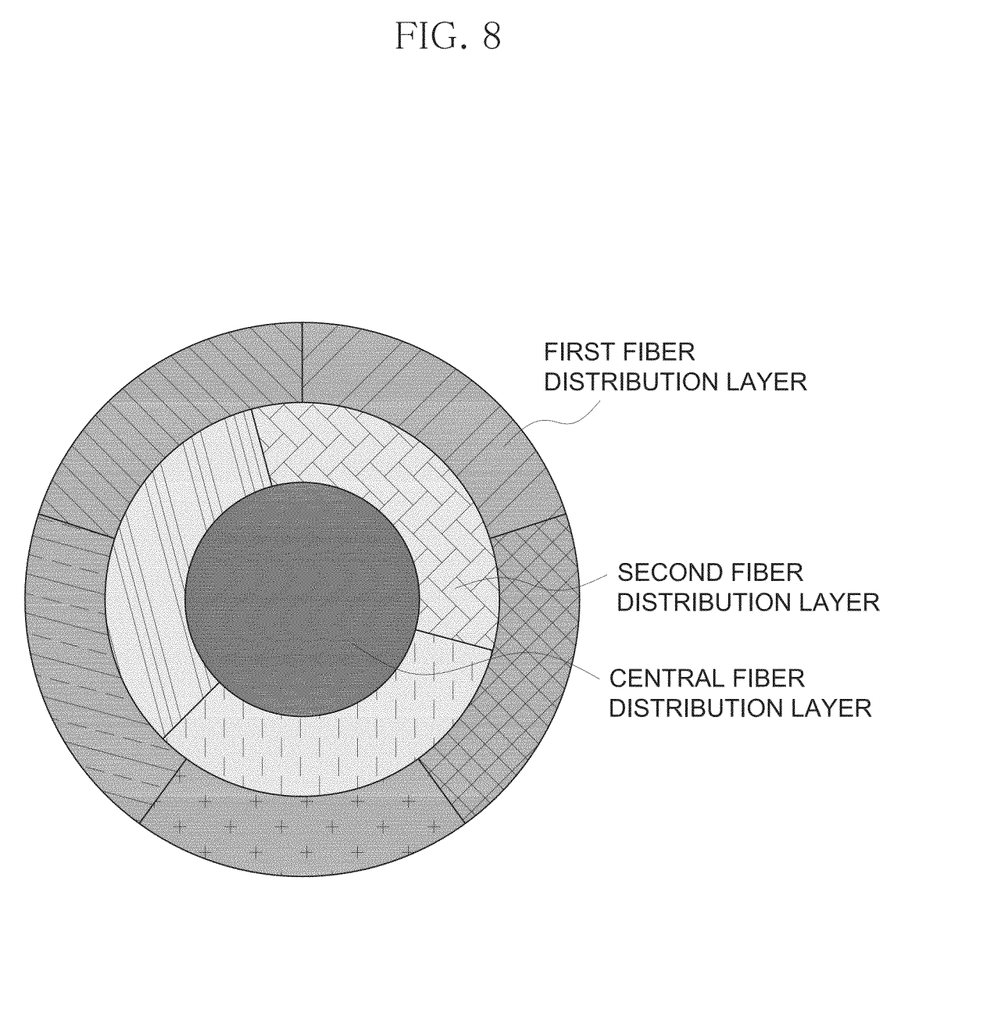
FIG. 8 is a schematic sectional diagram showing a hybrid FRP bar manufactured by supplying different kinds of fibers to plural regions separated by the coupling unit, in the nozzle of FIG. 7.

In the embodiment in which the coupling unit 13 made of a plate member and extending in the radial direction is disposed, the coupling unit 13 may serve as a separating unit for distinguishing the kinds of the fibers distributed in a single fiber distribution layer, in addition to the function of connecting the outer nozzle 11 and the middle nozzle 12. FIG. 7 is a schematic side view showing the nozzle of FIG. 2, observed in the longitudinal direction, namely observed along the arrow B of FIG. 2. As shown in FIG. 7, a plurality of coupling units 13 is provided along the circumference in the interval between the outer nozzle 11 and the first middle nozzle 12a, and thus the interval between the outer nozzle 11 and the first middle nozzle 12a is substantially distinguished into a plurality of inlets along the circumference. This is the same between the first middle nozzle 12a and the second middle nozzle 12b. In other words, since the plurality of coupling units 13 are also provided between the first middle nozzle 12a and the second middle nozzle 12b along the circumference, the interval is distinguished into a plurality of inlets. Therefore, if different kinds of fibers are respectively supplied to the inlets distinguished by the coupling units 13 in the corresponding fiber distribution layer, the FRP bar 1 may be manufactured into a shape of a hybrid FRP bar having a section in which different kinds of fibers are distributed in a single fiber distribution layer along the circumference. FIG. 8 is a schematic sectional view showing the FRP bar 1 which is manufactured as a hybrid FRP bar by supplying different kinds of fibers to a plurality of regions distinguished by the coupling units at the nozzle 100 of FIG. 7. In the sectional view of FIG. 8, different shades or patterns represent that different kinds of fibers are distributed.

As described above, according to the present invention, a hybrid FRP bar may be manufactured to have a desired number of fiber distribution layers in the radial direction. In addition, different kinds of fibers may also be distributed in a single fiber distribution layer to be distinguished into a plurality of regions in the circumferential direction.

Figure 9:
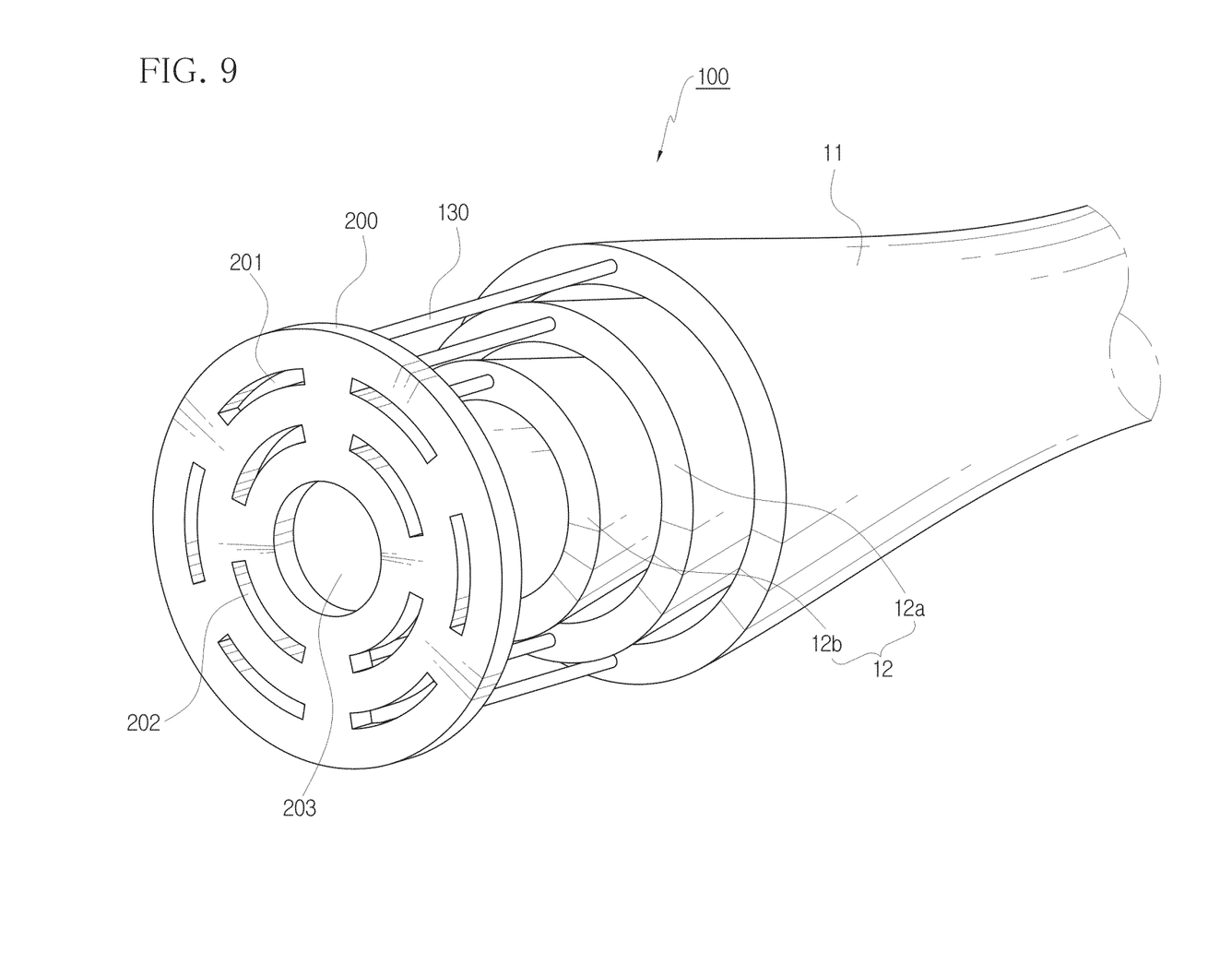
FIG. 9 is a schematic perspective view showing that a guide member is installed in front of an inlet of the nozzle of FIG. 2.

Meanwhile, in the present invention as described above, a guide member 200 may be further installed between the resin supplier 102 and the nozzle 100. FIG. 9 is a schematic perspective view showing that the guide member 200 is installed in front of the inlet of the nozzle 100 of FIG. 2. An example in which the nozzle 100 has a circular section will be described. When fibers are supplied to the nozzle 100, fibers located at an upper position may move downwards by their weights. In other words, when a fiber is supplied into the interval between the outer nozzle 11 and the first middle nozzle 12a, if the interval has a circular shape, the fiber may have a tendency of flowing down in the circumferential direction by its weight. The guide member 200 is installed to prevent this phenomenon. In detail, as shown in FIG. 9, penetration holes 201 extending in the circumferential direction to correspond to the interval between the outer nozzle 11 and the first middle nozzle 12a are intermittently formed along the circumference. In addition, penetration holes 202 extending in the circumferential direction are also intermittently formed at locations corresponding to the interval between the first middle nozzle 12a and the second middle nozzle 12b along the circumference. Moreover, a central penetration hole 203 is formed to correspond to the center portion of the second middle nozzle 12b. If a greater number of middle nozzles are provided, penetration holes extending in the circumferential direction are formed in the guide member 200 at locations corresponding to the interval of the middle nozzles. The guide member 200 configured as above may be made of a plate member.

When the guide member 200 is located between the resin supplier 102 and the nozzle 100, fibers stained with a resin while passing through the resin supplier 102 is supplied to the inlet of the nozzle 100 through the penetration hole of the guide member 200. As described above, the penetration holes 202 are intermittently formed in the guide member 200. Therefore, when the fibers entering the inlet of the nozzle 100 is to flow down in the circumferential direction due to their weights, the movement of the fibers is restricted by the penetration holes 202 of the guide member 200. Therefore, it is possible to prevent the fibers from flowing down in the circumferential direction and being distributed at unintended locations.

In particular, in addition to the above usage, the guide member 200 may be useful for manufacturing a hybrid FRP bar having a section in which different kinds of fibers are distinguishably distributed along the circumference in a single fiber distribution layer. In other words, since the penetration holes of the guide member 200 are intermittently formed, different kinds of fibers may pass through the penetration holes. Therefore, as shown in FIG. 8, it is possible to easily manufacture a hybrid FRP bar in which different kinds of fibers are distributed to be distinguished into a plurality of regions in the circumferential direction in a single fiber distribution layer.

In other words, by installing the guide member 200, different kinds of fibers may be distributed to be distinguished into a plurality of regions in the circumferential direction in a single fiber distribution layer. In this case, a connection rod 130 may be disposed at the rear surface of the guide member 200 so that the connection rod 130 is coupled to the outer nozzle 11 and the middle nozzle 12, which allows the guide member 200 to serve as the integrating unit 131 described above.

However, it is also possible that the guide member 200 is installed as a separate member, and like the case of FIG. 2, the coupling units 13 may be disposed between the outer nozzle 11 and the middle nozzle 12 and between the middle nozzles 12. In this case, the coupling units 13 just function as a member for simply coupling the outer nozzle 11 and the middle nozzle 12 and coupling the middle nozzles 12 to each other, and the guide member 200 may take a charge of distributing different kinds of fibers to be distinguished into a plurality of regions in the circumferential direction in a single fiber distribution layer.

Figure 10:
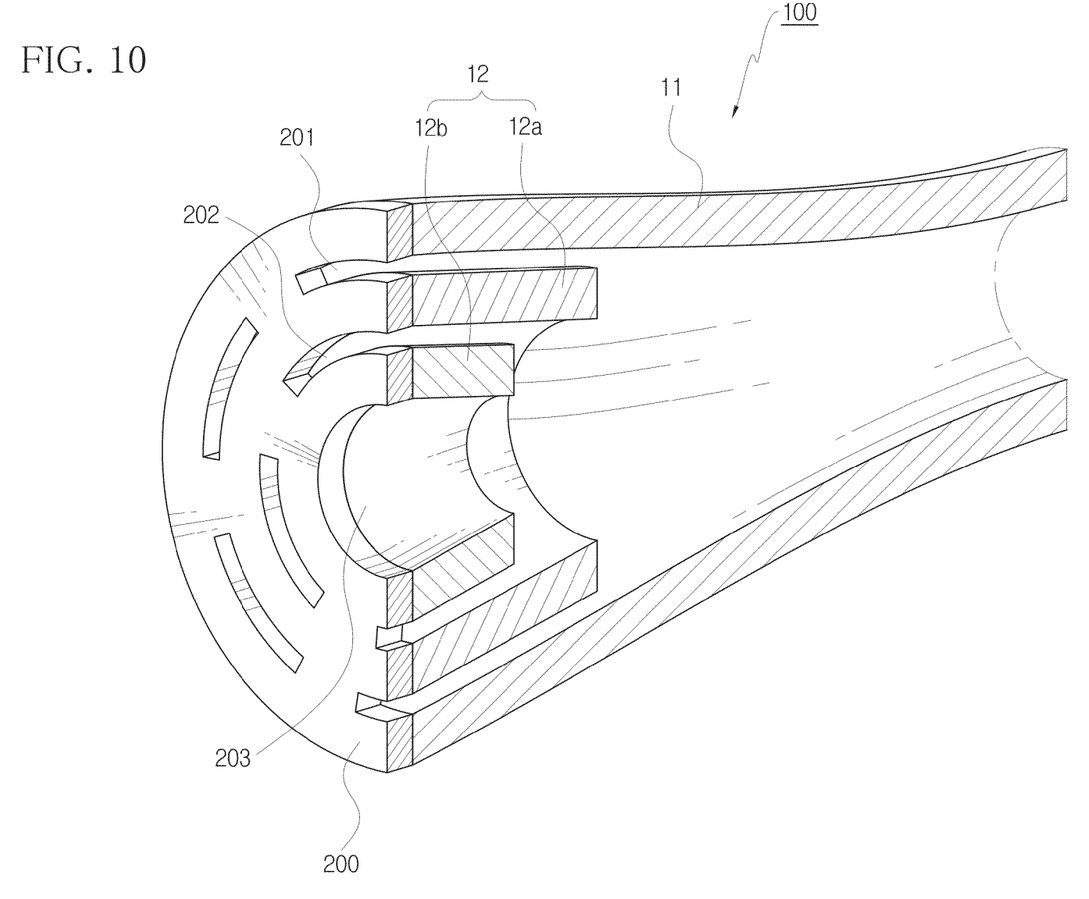
FIG. 10 is a perspective sectional view showing a nozzle corresponding to FIG. 3 according to an embodiment in which the guide member is integrally attached to the inlet of the nozzle.

Further, in the present invention, the guide member 200 may not be present at a location spaced apart from the inlet of the nozzle 100 but be integrally attached to the inlet of the nozzle 100. FIG. 10 is a perspective sectional view showing the nozzle 100 corresponding to FIG. 3, in which the guide member 200 is integrally attached to the inlet of the nozzle 100. As shown in FIG. 10, the guide member 200 may be integrally attached to the inlet of the nozzle 100 by means of welding or the like. In this case, the guide member 200 substantially functions as the coupling unit 13. In other words, the guide member 200 corresponds to the coupling unit 13.

Meanwhile, even though it has been described that the hybrid FRP bar manufactured in the present invention has a circular section, the present invention is not limited thereto but may have an oval shape, a polygonal shape or other various sectional shapes, and the sectional shape of the nozzle may also change accordingly. Therefore, in this specification, the term "circumferential direction" should be understood as meaning a direction along which a closed line is drawn in the section of the hybrid FRP bar. In addition, the term "radial direction" should be understood as meaning a direction directed from the sectional center of the hybrid FRP bar to an outer side.

As described above, according to the present invention, a hybrid FRP bar may be manufactured using at least two kinds of fibers which are distributed at specific locations of the section of the FRP bar as designed. Therefore, a fiber having a great elongation rate is distributed at an inner region of the hybrid FRP bar, and a fiber having a small elongation rate is distributed at an outer region of the hybrid FRP bar. In this way, it is possible to very easily manufacture a hybrid FRP bar with excellent performance, which does not cause great bending deflection when being used for a bending member.

What is claimed is:

1. A manufacturing apparatus for a fiber reinforced polymer (FRP) bar, which includes a fiber winding reel (101), a resin supplier (102), a nozzle (100) and a drawer (105) and manufactures a rod-shaped FRP bar with a fiber and a resin,
    wherein the nozzle (100) includes a tapered outer nozzle (11) having a penetration hole formed at its center and having an inlet with a greater sectional area than an outlet of the tapered outer nozzle (11), and a plurality of middle nozzles (12) disposed at the inlet of the tapered outer nozzle (11) so that one middle nozzle is located inside another middle nozzle with an interval,
    wherein a plate-shaped guide member (200) is disposed in front of an inlet of the nozzle (100),
    wherein the plate-shaped guide member (200) has penetration holes extending in a circumferential direction and intermittently formed along the circumference at locations corresponding to any one or all of the intervals between the tapered outer nozzle (11) and the middle nozzle (12) and between the middle nozzles (12),
    wherein connection rods (130) are disposed at the rear surface of the plate-shaped guide member (200) so that the connection rods (130) are coupled to the tapered outer nozzle (11) and the plurality of middle nozzles (12) and the plated-shaped guide member (200) is coupled to the nozzle (100),
    wherein fibers are supplied to the inlet of the nozzle (100) through the penetration holes of the plate-shaped guide member (200), and
    wherein fibers are supplied through a center hole of the middle nozzle located at an innermost location, through intervals between the middle nozzles and through intervals between the middle nozzles and the outer nozzle, thereby making a hybrid FRP bar having a section in which the fibers configure a plurality of fiber distribution layers from the center of the FRP bar toward the outside.

2. A nozzle (100) for manufacturing a rod-shaped FRP bar with a fiber and a resin,
    wherein the nozzle (100) includes a tapered outer nozzle (11) having a penetration hole formed at its center and having an inlet with a greater sectional area than an outlet of the tapered outer nozzle (11), and a plurality of middle nozzles (12) disposed at the inlet of the tapered outer nozzle (11) so that one middle nozzle is located inside another middle nozzle with an interval,
    wherein a plate-shaped guide member (200) is disposed in front of an inlet of the nozzle (100),
    wherein the plate-shaped guide member (200) has penetration holes extending in a circumferential direction and intermittently formed along the circumference at locations corresponding to any one or all of the intervals between the tapered outer nozzle (11) and the middle nozzle (12) and between the middle nozzles (12),
    wherein connection rods (130) are disposed at the rear surface of the plate-shaped guide member (200) so that the connection rods (130) are coupled to the tapered outer nozzle (11) and the plurality of middle nozzles (12) and the plated-shaped guide member (200) is coupled to the nozzle (100),
    wherein fibers are supplied to the inlet of the nozzle (100) through the penetration holes of the plate-shaped guide member (200), and
    wherein fibers are supplied through a center hole of the middle nozzle located at an innermost location, through intervals of the middle nozzles and, through intervals between the middle nozzles and the outer nozzle, thereby making a hybrid FRP bar having a section in which the fibers configure a plurality of fiber distribution layers from the center of the FRP bar toward the outside.

* * * * *